United States Patent Office 3,235,495
Patented Feb. 15, 1966

3,235,495
STABILIZED FLUID SILICONES
Fritz A. Buehler, Erlton, N.J., assignor to Socony Mobil Oil Company, Inc., a corporation of New York
No Drawing. Filed Mar. 12, 1962, Ser. No. 179,218
9 Claims. (Cl. 252—34.7)

This application is a continuation-in-part of my copending application Serial No. 102,961, filed April 14, 1961, and now abandoned.

This invention has to do with lubricating compositions and particularly with fluid lubricating compositions comprising silicones, particularly certain polysiloxanes, of improved high temperature stability.

In recent years, a number of silicone fluids have been developed for use as lubricants. They have been so used as fluid lubricant compositions and in greases. Since they are stable at temperatures well above temperatures at which mineral oils and natural and synthetic esters decompose, they have been used extensively as high temperature lubricants. However, with the ever increasing demand for lubricating oils capable of resisting still higher operating temperatures, even the silicones have not proved entirely satisfactory. Thus, at temperatures in the order of 600° F. or higher the silicone fluids tend to gel at undesirably increased rates so that the useful life thereof is substantially lessened. In order to overcome this problem, the art has turned to the use of chemical additives designed to improve the high temperature stability of these oils and some additives have been found which effect marked improvements in this regard as indicated by the ability of the silicones containing such additives to resist gel formation for longer periods under these high temperature conditions. A particularly effective additive, for example, is iron octoate, i.e., the iron salt of ethyl hexanoic acid. Still further improvement in the stability of these oils, however, would be highly desirable.

It has now been found in accordance with the present invention that the high temperature stability of the silicone fluids stabilized with iron octoate can be substantially further improved and the useful service life of the fluids thereby substantially lengthened by the employment therein of a second additive, viz., a compound selected from one of the following: (1) tertiary alkyl primary mono-amines, (2) amic acids derived from aliphatic dicarboxylic acids or anhydrides by reaction of such acid with either (a) a tertiary alkyl primary mono-amine or (b) glycine, and (3) tertiary alkyl primary mono-amine salts of amic acids.

Accordingly, it is the prime object of the invention to provide silicone fluid compositions of improved high temperature stability. Other and further objects and advantages of the invention will be apparent from the following detailed description thereof.

The silicone fluids which are stabilized in accordance with this invention are polysiloxanes of the general formula:

where $n$ has a value of from 2.0 to 2.9 and R is selected from the group consisting of (a) methyl radicals, (b) mixed methyl and phenyl radicals in a mol ratio of methyl to phenyl of from about 0.5 to about 25, (c) mixed methyl and chlorophenyl radicals in a mol ratio of methyl to chlorophenyl of from about 0.5 to about 25 and (d) mixed methyl, phenyl and chlorophenyl radicals in a mol ratio of methyl to total phenyl and chlorophenyl of from about 0.5 to about 25, said chlorophenyl radicals in all instances containing from 1 to 5 chlorine atoms each.

Obviously, physical mixtures of polysiloxanes prepared from one or more of the polysiloxanes in which R is as defined in (a), (b) and (c) are within the scope of the invention.

Polysiloxanes of the aforesaid character are well known to the art. Details as to their preparation and properties are given, for example, in "An Introduction to the Chemistry of the Silicones," E. G. Rochow, 2nd ed. (1951), John Wiley & Sons, New York, and "Organosilicon Compounds," C. Eaborn (1960), Academic Press, New York.

The tertiary alkyl primary mono-amines which are utilized per se as stabilizers in the compositions of the invention, or which are employed in the formation of the amic acids and amic acid-amine salts utilized in the invention, are those having from 4 to about 24 carbon atoms and in which the primary nitrogen atom is attached directly to a tertiary carbon atom. These amines all contain the terminal unit

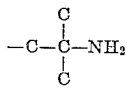

Specific tertiary alkyl primary mono-amines contemplated by the invention are, for example, tertiary butyl primary amine, tertiary octyl primary amine, tertiary nonyl primary amine, tertiary decyl primary amine, tertiary dodecyl primary amine, tertiary tetradecyl primary amine, tertiary hexadecyl primary amine, tertiary octadecyl primary amine, tertiary eicosyl primary amine, tertiary docosyl primary amine and tertiary tetracosyl primary amine.

Mixtures of tertiary alkyl primary amines are highly suitable in the invention. A typical mixture is one comprised of tertiary alkyl primary amines having from about 12 to 15 carbon atoms and an average of about 12 carbon atoms. This mixture, designated hereinafter as "Amine A," contains, by weight, about 85% of tertiary dodecyl amine, about 10% of tertiary pentadecyl amine and relatively small amounts, i.e., less than about 5% of amines having less than 12 or more than 15 carbon atoms.

Amine mixtures, such as "Amine A," can be prepared by methods within the knowledge of those skilled in the art. For example, such mixtures may be prepared from polypropylene or polybutylene fractions or mixtures thereof. Thus, a selected polymer fraction composed of mixed polyolefins within a desired molecular weight range can be converted to the corresponding tertiary alkyl primary amines as follows: The selected polyolefin fraction is first hydrated by means of sulfuric acid and water to convert it to the corresponding alcohols. The alcohol mixture is then converted to alkyl chlorides by reaction with dry hydrogen chloride. Finally, the alkyl chloride mixture is condensed under pressure with ammonia to produce the tertiary alkyl primary amine mixture. Specific methods of preparing the tertiary alkyl primary amines are disclosed in the Journal of Organic Chemistry, vol. 20 (1955), page 295 et seq.

The amic acids employed in the invention are well known to the art and may be prepared simply by heating together one mol proportion of either a tertiary alkyl primary amine, or glycine, and one mol proportion of a dicarboxylic acid, or anhydride, at a temperature of from about 50° C. to about 150° C. The reaction is generally complete within a short time. However, to insure complete reaction the reaction mixture is generally heated with stirring for from ½ hour to about 3 hours. Where desirable, a non-polar solvent, such as benzene, toluene, xylene or the like, may be employed to increase the fluidity of the reaction mixture, the solvent being distilled off when the reaction is completed. Where the dicarboxylic acid rather than the anhydride is used, one mol of water of condensation will be formed in the reaction. In this case, it is preferred to employ a solvent, such as one of those above-mentioned, whereby the water is removed from the reaction as an azeotropic mixture.

The amine salts of the invention are also well known and are prepared by reacting one mol proportion of the amic acid, formed as above-described from the dicarboxylic acid or anhydride, with one mol proportion of the tertiary alkyl primary mono-amine. The reaction is conducted by simply heating the reactants together at a temperature of from about 50° C. to about 150° C. for a period of from about ½ hour to about 3 hours. Here again, as in the preparation of the amic acid, a non-polar solvent may be employed if necessary to facilitate the reaction.

Aliphatic dicarboxylic acids or anhydrides in general may be used to prepare the amic acids and amine salts employed in the invention. Thus, acids, such as oxalic, maleic, malonic, succinic, glutaric, adipic, pimelic, suberic, azelaic, sebacic, etc. and their anhydrides, may be used. Such acids, having one or more aliphatic substituent groups therein, such as an alkyl or alkenyl group of from one to about 18 carbon atoms, may be employed. The acids and anhydrides particularly contemplated are those having a total of from 2 to about 30 carbon atoms. Succinic acid and tetrapropenyl succinic acid, for example, are highly suitable, the amic acids and amine salts thereof being particularly preferred stabilizers in accordance with the invention.

A full understanding of the invention will be had by reference to the following specific examples and tests.

HIGH TEMPERATURE GELLING TEST

This test determines the ability of a silicone oil to remain fluid, i.e., resist gelation at 600° F. in the presence of air. The test procedure is as follows: A sample of the oil in a Pyrex beaker is placed in an oven and maintained at 600° F. under forced air circulation. The fluidity of the oil is then observed periodically until the sample shows no gravity flow. The elapsed time (from the beginning of the test) to this point is then recorded as the "gel time" of the sample.

*Example 1*

The base fluid used was a methyl chlorophenyl polysiloxane having a molecular weight of about 1200 and a mol ratio of methyl to chlorophenyl groups therein of about 20 (kv. @ −65° F.=3000 cs. and at 77° F.= 60 cs.).

(a) To the base fluid there was added 0.25%, by weight, of iron octoate. This composition was subjected to the High Temperature Gelling Test and exhibited a "gel time" of 490 hours.

(b) To the above composition (a) there was added 5.0%, by weight, of "Amine A," described hereinabove. This composition when subjected to the High Temperature Gelling Test showed a "gel time" of 840 hours.

*Example 2*

The base fluid used in this example was a methylphenyl polysiloxane having a molecular weight of about 2200 and a methyl to phenyl ratio of about 8 (kv. @ −65° F.= 3500 cs. and at 77° F.=75 cs.).

(a) To the base fluid there was added 0.25%, by weight, of iron octoate. A sample of this composition when subjected to the High Temperature Gelling Test exhibited a "gel time" of 600 hours.

(b) To a portion of composition (a) there was added 5.0%, by weight, of the amic acid of glycine and tetrapropenyl succinic acid prepared as follows: A mixture of 75 grams (one mol) of glycine and 266 grams (one mol) of tetrapropenyl-succinic anhydride were slowly heated with stirring to 115° C. for about 3 hours to insure complete reaction. This composition when subjected to the High Temperature Gelling Test showed a "gel time" of 925 hours.

*Example 3*

The base fluid used in this example was the same as used in Example 2. As shown in Example 2 (a), this base fluid with 0.25% of added iron octoate exhibited a "gel time" of 600 hours.

To the base fluid containing the 0.25% iron octoate there was added 5%, by weight, of a tertiary alkyl primary amine salt of succinamic acid prepared as follows: A mixture of 50 grams (0.25 mol) of "Amine A," supra, 25 grams (0.25 mol) of succinic anhydride and 67 grams of xylene were stirred at 85° C. for one and one-half hours. To the succinamic acid thus formed there was added at room temperature an additional 50 grams (0.25 mol) of "Amine A" and the reaction mixture stirred at 85–90° C. for an additional one and one-half hours to form the amine salt of the succinamic acid. The temperature was then increased to distill off the xylene. This composition when subjected to the High Temperature Gelling Test showed a "gel time" of 1000 hours.

*Example 4*

The same amine salt of succinamic acid tested in Example 3 was tested in another polysiloxane fluid. The fluid was a methylphenyl polysiloxane having a molecular weight of about 1100 and a mol ratio of methyl to phenyl of about 0.8 (kv. @ 77° F.=1000 cs. and at 21° F.= 28 cs.).

(a) To the base fluid there was added 0.25%, by weight, of iron octoate. This composition when subjected to the High Temperature Gelling Test showed a "gel time" of 920 hours.

(b) To composition (a) there was added 5.0%, by weight, of the same amine salt of succinamic acid shown in Example 3. This composition when subjected to the High Temperature Gelling Test showed a "gel time" of greater than 2200 hours.

It is seen from the foregoing examples that the amines, amic acids and amic acid-amine salts of the present invention substantially increase the high temperature stabilities of polysiloxane oils stabilized with iron octoate.

The amount of iron octoate added to the polysiloxane is quite small, the maximum stabilizing effect with this additive being provided by the use of from about 0.2% to about 0.5%, by weight, thereof. However, as little as 0.01% will provide significant improvement, while the use of amounts up to about 1% is desirable in certain instances in order to allow for some loss of the additive by adsorption or sedimentation under service conditions. In general, therefore, the amount of iron octoate used will range from about 0.1% to about 1%, by weight, the usual amount being from about 0.2% to about 0.5%.

The amount of the amine, amic acid or amic acid-amine salt to be added to the polysiloxane may suitably range from about 0.5% to about 10%, by weight, depending upon the solubility of the particular additive and its volatility at service temperatures, the usual amount being from about 0.5% to about 5%.

The stabilized polysiloxane compositions of the invention may be employed as blending stocks for conventional petroleum lubricating oils and synthetic oils, such as polyphenyl ethers, mono- and polyesters of carboxylic acids, etc., to improve the high temperature stabilities of these oils.

Although the present invention has been described and illustrated herein in terms of specific examples and embodiments thereof, it is not intended that the scope of the invention be limited in any way thereby, but only as indicated in the following claims.

What is claimed is:

1. A high temperature-stabilized polysiloxane fluid of the general formula:

where $n$ has a value of from 2.0 to 2.9 and R is selected from the group consisting of (a) methyl radicals, (b) mixed methyl and phenyl radicals in a mol ratio of methyl to phenyl of from about 0.5 to about 25, (c) mixed methyl and chlorophenyl radicals in a mol ratio of methyl to chlorophenyl of from about 0.5 to about 25 and (d) mixed methyl, phenyl and chlorophenyl radicals in a mol ratio of methyl to total phenyl and chlorophenyl of from about 0.5 to about 25, said chlorophenyl radicals in all instances containing from 1 to 5 chlorine atoms each; said fluid containing from about 0.1% to about 1%, by weight, of iron octoate and from about 0.05% to about 10%, by weight, of a compound selected from the group consisting of (1) tertiary alkyl primary mono-amines of from 4 to about 24 carbon atoms, (2) an amic acid prepared by reacting a member of the group consisting of an aliphatic dicarboxylic acid having from 2 to about 30 carbon atoms and the anhydride of such acid with a member of the group consisting of a tertiary alkyl primary mono-amine of from 4 to about 24 carbon atoms and glycine, and (3) amine salts prepared by reacting an amic acid as defined in (2) with a tertiary alkyl primary mono-amine having from 4 to about 24 carbon atoms.

2. A high temperature-stabilized polysiloxane fluid of the general formula:

$$R_nSiO_{\frac{4-n}{2}}$$

where $n$ has a value of of from 2.0 to 2.9 and R is selected from the group consisting of (a) methyl radicals, (b) mixed methyl and phenyl radicals in a mol ratio of methyl to phenyl of from about 0.5 to about 25, (c) mixed methyl and chlorophenyl radicals in a mol ratio of methyl to chlorophenyl of from about 0.5 to about 25 and (d) mixed methyl, phenyl and chlorophenyl radicals in a mol ratio of methyl to total phenyl and chlorophenyl of from about 0.5 to about 25, said chlorophenyl radicals in all instances containing from 1 to 5 chlorine atoms each; said fluid containing from about 0.1% to about 1%, by weight, of iron octoate and from about 0.05% to about 10%, by weight, of a mixture of tertiary alkyl primary mono-amines containing from about 12 to about 15 carbon atoms and an average of about 12 carbon atoms per molecule.

3. A high temperature-stabilized polysiloxane fluid of the general formula:

$$R_nSiO_{\frac{4-n}{2}}$$

where $n$ has a value of of from 2.0 to 2.9 and R is selected from the group consisting of (a) methyl radicals, (b) mixed methyl and phenyl radicals in a mol ratio of methyl to phenyl of from about 0.5 to about 25, (c) mixed methyl and chlorophenyl radicals in a mol ratio of methyl to chlorophenyl of from about 0.5 to about 25 and (d) mixed methyl, phenyl and chlorophenyl radicals in a mol ratio of methyl to total phenyl and chlorophenyl of from about 0.5 to about 25, said chlorophenyl radicals in all instances containing from 1 to 5 chlorine atoms each; said fluid containing from about 0.1% to about 1%, by weight, of iron octoate and from about 0.05% to about 10%, by weight, of the amic acid prepared by reaction of tetrapropenyl succinic acid anhydride and glycine.

4. A high temperature-stabilized polysiloxane fluid of the general formula:

$$R_nSiO_{\frac{4-n}{2}}$$

where $n$ has a value of from 2.0 to 2.9 and R is selected from the group consisting of (a) methyl radicals, (b) mixed methyl and phenyl radicals in a mol ratio of methyl to phenyl of from about 0.5 to about 25, (c) mixed methyl and chlorophenyl radicals in a mol ratio of methyl to chlorophenyl of from about 0.5 to about 25 and (d) mixed methyl, phenyl and chlorophenyl radicals in a mol ratio of methyl to total phenyl and chlorophenyl of from about 0.5 to about 25, said chlorophenyl radicals in all instances containing from 1 to 5 chlorine atoms each; said fluid containing from about 0.1% to about 1%, by weight, of iron octoate and from about 0.05% to about 10%, by weight, of the amic acid prepared by reaction of succinic acid anhydride and a mixture of tertiary alkyl primary mono-amines having from about 12 to about 15 carbon atoms and an average of about 12 carbon atoms per molecule.

5. A high temperature-stabilized polysiloxane fluid of the general formula:

$$R_nSiO_{\frac{4-n}{2}}$$

where $n$ has a value of from 2.0 to 2.9 and R is selected from the group consisting of (a) methyl radicals, (b) mixed methyl and phenyl radicals in a mol ratio of methyl to phenyl of from about 0.5 to about 25, (c) mixed methyl and chlorophenyl radicals in a mol ratio of methyl to chlorophenyl of from about 0.5 to about 25 and (d) mixed methyl, phenyl and chlorophenyl radicals in a mol ratio of methyl to total phenyl and chlorophenyl of from about 0.5 to about 25, said chlorophenyl radicals in all instances containing from 1 to 5 chlorine atoms each; said fluid containing from about 0.1% to about 1%, by weight, of iron octoate and from about 0.05% to about 10%, by weight, of an amine salt of succinamic acid prepared by reacting succinic acid anhydride with a mixture of tertiary alkyl primary mono-amines having from about 12 to about 15 carbon atoms and an average of about 12 carbon atoms per molecule to form the succinamic acid of said amine and succinic anhydride and reacting said succinamic acid with an additional amount of the said amine mixture to form the amine salt of the succinamic acid.

6. A high temperature-stabilized methylchlorophenyl polysiloxane fluid having a mol ratio of methyl to chlorophenyl groups therein of about 20, said fluid containing from about 0.2% to about 0.5%, by weight, of iron octoate and from about 0.5% to about 5%, by weight, of a mixture of tertiary alkyl primary mono-amines having from about 12 to about 15 carbon atoms and an average of about 12 carbon atoms per molecule.

7. A high temperature-stabilized methylphenyl polysiloxane fluid having a mol ratio of methyl to phenyl groups therein of about 8, said fluid containing from about 0.2% to about 0.5%, by weight, of iron octoate and from about 0.5% to about 5%, by weight, of the amic acid prepared by reaction of tetrapropenyl succinic acid anhydride and glycine.

8. A high temperature-stabilized methylphenyl polysiloxane fluid having a mol ratio of methyl to phenyl groups therein of about 8, said fluid containing from about 0.2% to about 0.5%, by weight, of iron octoate and from about 0.5% to about 5%, by weight, of an amine salt of succinamic acid prepared by reacting succinic acid anhydride with a mixture of tertiary alkyl primary mono-amines having from about 12 to about 15 carbon atoms and an average of about 12 carbon atoms per molecule to form the succinamic acid of said amine and succinic anhydride and reacting said succinamic acid with an additional amount of said amine mixture to form the amine salt of the succinamic acid.

9. A high temperature-stabilized methylphenyl polysiloxane having a mol ratio of methyl to phenyl groups therein of about 0.8, said fluid containing from about 0.2% to about 0.5%, by weight, of iron octoate and from about 0.5% to about 5%, by weight, of an amine salt of succinamic acid prepared by reacting succinic acid anhydride with a mixture of tertiary alkyl primary mono-amines having from about 12 to about 15 carbon atoms and an average of about 12 carbon atoms per molecule to form the succinamic acid of said amine and succinic anhydride and reacting said succinamic acid with an additional amount of said amine mixture to form the amine salt of the succinamic acid.

References Cited by the Examiner
UNITED STATES PATENTS

| | | | |
|---|---|---|---|
| 2,389,807 | 11/1945 | McGregor et al. | 260—448.2 |
| 2,445,567 | 7/1948 | Elliott | 252—49.6 X |
| 2,458,425 | 1/1949 | Rocchini | 252—33.6 |
| 2,699,427 | 1/1955 | Smith et al. | 252—51.5 X |
| 2,908,711 | 10/1959 | Halter et al. | 252—51.5 X |
| 2,945,838 | 7/1960 | Prober | 260—448.2 |
| 2,971,910 | 2/1961 | Calhoun | 252—34 |
| 3,002,927 | 10/1961 | Awe et al. | 260—448.2 |
| 3,003,960 | 10/1961 | Andress et al. | 252—33.6 |
| 3,009,877 | 11/1961 | Nielsen | 252—37.2 |
| 3,033,789 | 5/1962 | Asseff | 252—49.9 |

DANIEL E. WYMAN, *Primary Examiner.*